United States Patent [19]
Palczynski, Jr.

[11] Patent Number: 5,220,271
[45] Date of Patent: Jun. 15, 1993

[54] CROSS REGULATOR FOR A MULTIPLE OUTPUT POWER SUPPLY

[75] Inventor: John J. Palczynski, Jr., Hopkinton, Mass.

[73] Assignee: Digital Equipment Corporation, Maynard, Mass.

[21] Appl. No.: 853,061

[22] Filed: Mar. 17, 1992

[51] Int. Cl.⁵ .............................................. G05F 1/577
[52] U.S. Cl. .................................... 323/266; 323/267
[58] Field of Search ............................... 323/266, 267

[56] References Cited
U.S. PATENT DOCUMENTS

| | | |
|---|---|---|
| 3,240,948 | 3/1966 | Burley . |
| 3,275,927 | 9/1966 | Kupferberg . |
| 3,983,473 | 9/1976 | Sanderson . |
| 4,669,036 | 5/1987 | Cowett, Jr. . |
| 4,849,868 | 7/1989 | Fisher ..................... 323/267 X |

Primary Examiner—Emanuel T. Voeltz
Attorney, Agent, or Firm—Ronald E. Myrick; Barry N. Young; Ronald C. Hudgens

[57] ABSTRACT

The disclosed invention regulates the voltage of an output terminal of a multiple output power supply. It operates by diverting current from one output terminal to another output terminal. The invention is less expensive than other alternatives, and has performance advantages over comparably priced alternatives. It may be used in various configurations to maintain an output voltage below a limit, above a limit, or within a range. Additional configurations may be used to regulate the voltages of multiple output terminals.

20 Claims, 4 Drawing Sheets

CROSS REGULATOR FOR A MULTIPLE OUTPUT POWER SUPPLY

FIELD OF THE INVENTION

This invention relates to an apparatus for regulating the voltage at the output terminals of a multiple output power supply.

BACKGROUND OF THE INVENTION

A primary power supply design goal is the maintenance of a specified output voltage, within an allowable tolerance. An obstacle to achieving this goal is posed by the series resistance contained in the path leading to the output terminal. This resistance consists of parasitic resistance in the transformer, in addition to any other resistance inherent in the output path.

Because of this series resistance, the voltage at an output terminal varies with the load on that output terminal. This occurs in spite of the fact that the voltage of the primary transformer winding remains constant. As the load on an output terminal increases, additional current is drawn through its output path. The additional current causes an increased voltage drop across the series resistance, resulting in a reduction of the output terminal voltage. Conversely, a reduction of the load on an output causes the output terminal voltage to increase.

Secondary voltage control is often used to control the voltage of a power supply output terminal. Secondary voltage control operates by adjusting the voltage generated in the secondary winding of the transformer in response to the voltage sensed at the output terminal.

The effectiveness of secondary voltage control is limited, however, where more than one output terminal shares a common transformer. While the voltage of one output terminal is sensed and regulated by the secondary voltage control, the voltage at other output terminals fluctuate due to changes in their respective loads. The voltages of these other output terminals also fluctuate as the secondary voltage control adjusts the transformer voltage to regulate the voltage of the sensed output terminal.

Magnetic amplifier control is sometimes used to regulate the voltage of these output terminals which are not regulated by the secondary voltage control. This technique uses a magnetic amplifier in series with the output path, and a controllable current source capable of injecting current into the magnetic amplifier. When activated, this current source establishes a flux in the magnetic amplifier that is in opposition to the output terminal current. Regulation of the output terminal voltage is achieved by controlling the current source in response to the output terminal voltage.

Shunt regulators are also used to regulate output terminal voltages. Shunt regulators limit the increase in the output terminal voltage that normally occurs in response to load reduction. When the voltage of the output terminal exceeds a predetermined threshold, the shunt regulator diverts current from the output path, through a shunt resistor, to ground. This current diversion increases the load on the output, thereby increasing the voltage drop across the output path series resistance. As a result, the output terminal voltage is lowered. The resulting upper limit on output terminal voltage is obtained at the expense of power dissipated in the shunt resistor.

In view of the foregoing, it is desirable to have an inexpensive device to regulate the output terminal voltages for a multiple output power supply. It is also desirable to achieve this regulation while minimizing the amount of power dissipated. Further, it is desirable that the device be able to operate in conjunction with, or in the absence of, other voltage control circuits, such as secondary voltage control or the like.

SUMMARY OF THE INVENTION

In a broad sense, the invention is an apparatus for regulating the voltage of a power supply output terminal by diverting current from one output terminal to another. The current is diverted when the voltage of the regulated output terminal is outside of a voltage limit. The voltage limit is established by a reference source. As described, the invention is used in a multiple output, common transformer power supply.

In a narrower sense, the invention relates to a device for maintaining the voltage of an output terminal within a voltage limit by selectively diverting current from one output terminal, through a current limiting resistor, to another output terminal. The current is diverted by a switch which is activated when the voltage of the one output terminal is outside of the voltage limit.

The invention further relates to a device for regulating the voltage of an output terminal within a limit by selectively diverting a variable amount of current from one output terminal, through a current limiting resistor, to another output terminal. An increasing amount of current is diverted as the voltage of the regulated output terminal approaches the voltage limit.

The invention may be used in a number of configurations, and may be used in conjunction with other voltage control methods, such as secondary voltage control. These configurations and other aspects of the invention will be apparent from the detailed description of the invention given in connection with the drawings.

DETAILED DESCRIPTION OF THE PREFERRED EMBODIMENT

Figure 1:
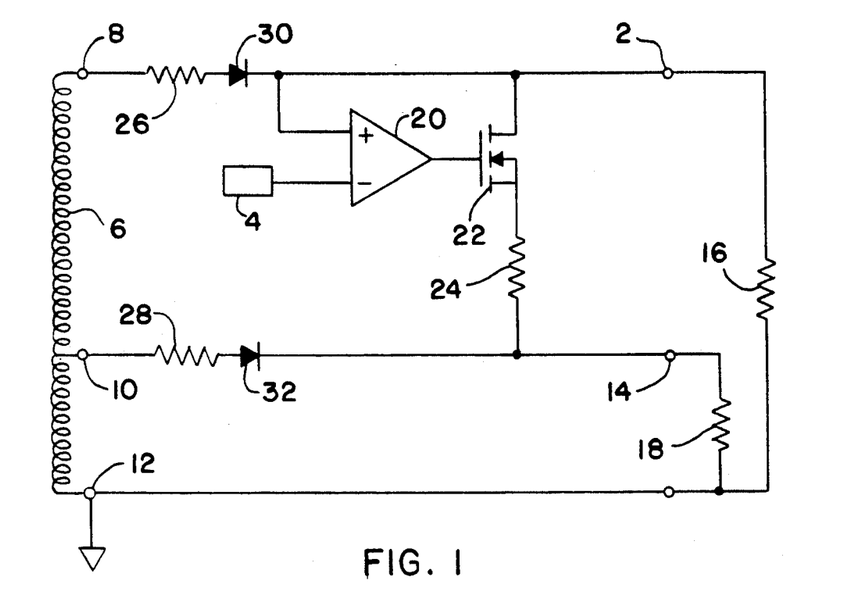
FIG. 1 is a schematic diagram of the invention used in a circuit to regulate a voltage output within a maximum voltage limit.

FIG. 1 shows the invention configured in a circuit to maintain the voltage of a power supply output terminal 2 below a voltage limit. The voltage limit is established by a reference voltage, which is produced by a reference source 4. The reference source 4 may produce the reference voltage with any suitable means, such as a reference zener diode or the like. The reference source 4 may also be remotely located from the power supply, or produce a variable reference voltage. A remote reference source 4 can, by varying the reference voltage, modify the voltage limit, thereby remotely controlling the operation of the invention.

Referring to FIG. 1, the power supply has a transformer with a secondary winding 6 having two output taps 8, 10 and a reference terminal 12. Each of the two output taps 8, 10 is coupled to a corresponding output terminal 2, 14 of the power supply. One of the output terminals 2 is at a higher voltage potential than the other output terminal 14. Each output terminal 2, 14 has an associated load, represented in FIG. 1 by resistors 16, 18. A comparator 20 has as its inputs the higher potential output terminal 2 and the output of the reference source 4. The output of the comparator 20 is coupled to the control input of a switch 22. The conductive path of the switch 22 is connected in series with a current limiting resistor 24. The switch 22 and resistor 24 series combination is connected between the output terminals 2, 14.

Each output terminal 2, 14 has a series resistance 26, 28 and a diode 30, 32, the diodes 30, 32 serving as half-wave rectifiers. The diodes 30, 32 are connected between the respective output tap 8, 10 and corresponding output terminal 2, 14, as shown in FIG. 1. Full-wave rectifiers may be used in place of the half-wave rectifiers shown in the illustrations. The series resistances 26, 28 are not discrete elements, but rather represent the resistance inherent in the circuits and in the transformer.

during operation of the circuit of FIG. 1, the comparator 20 compares the voltage of the higher potential output terminal 2 with the voltage limit established by the reference source 4. If the voltage limit is exceeded, the comparator 20 produces a switch signal which turns on the conductive path of the switch 22. This causes current to be directed, through the current limiting resistor 24, from the higher potential output terminal 2 to the lower potential output terminal 14. The current flowing through the series resistance 26 of the higher potential output path is correspondingly increased. This increased current flow causes an increased voltage drop across the series resistance 26 of the higher potential output terminal 2. Thus, the circuit of FIG. 1 lowers the voltage at the higher potential output terminal 2. When the voltage of the higher potential output terminal 2 drops below the voltage limit, the comparator 20 stops producing the switch signal, turning off the conductive path of the switch 22.

The value of the current limiting resistor 24 is chosen so that the current flowing through the switch 22 when the switch 22 is closed does not exceed either the capability of the switch 22, or the desired maximum power loss in the current limiting resistor 24.

In the preferred embodiment, an operational amplifier serves as the comparator 20. It is also preferred that a field effect transistor be used as the switch 22, and that the field effect transistor be operated in the linear range. A transistor may also serve as the switch 22.

By using a field effect transistor, operated in the linear range, as the switch 22, and an operational amplifier as the comparator 20, the invention can divert a variable amount of current through the current limiting resistor 24. As the voltage of the higher potential output terminal 2 rises, approaching the voltage limit, the comparator 20 gradually alters the switch signal, increasing the conductivity of the switch 22. Similarly, as the voltage of the higher potential output terminal 2 recedes from the voltage limit, the comparator 20 gradually alters the switch signal to decrease the conductivity of the switch 22. Thus, in the preferred embodiment, the switch 22 varies the quantity of diverted current, thereby maintaining the voltage of the higher potential output terminal 2 at or below the voltage limit.

Figure 2:
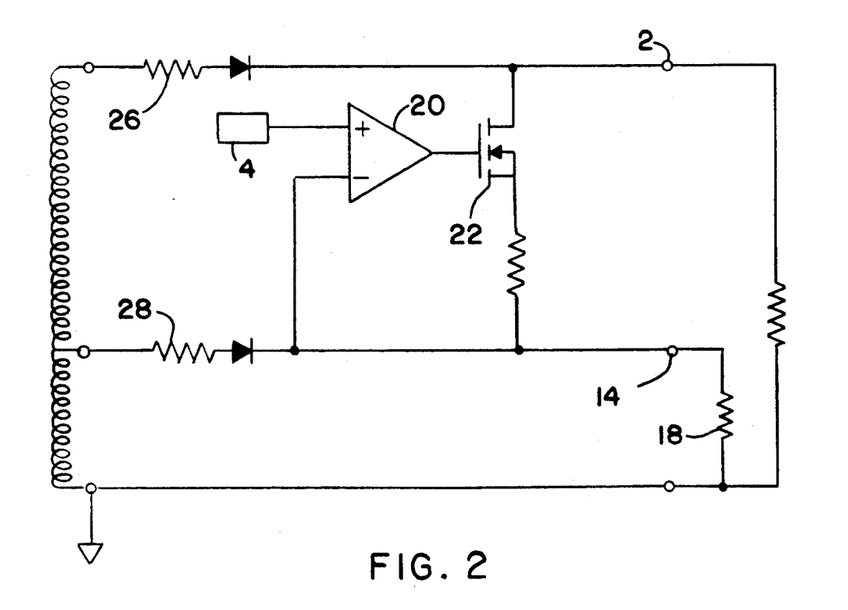
FIG. 2 is a schematic diagram of the invention used in a circuit to regulate a voltage output within a minimum voltage limit.

The circuit of FIG. 2 is configured to maintain the voltage of a lower potential output terminal 14 above a minimum voltage limit established by a reference source 4. As the voltage of the lower potential output terminal 14 approaches the voltage limit, the comparator 20 alters the switch signal so as to increase the conductivity of the switch 22. Current is thereby directed from the higher potential output terminal 2 to the lower potential output terminal 14. While the current supplied to the lower potential load 18 remains constant, a reduced portion of this current is derived through the lower potential series resistance 28. The reduced current flow through this series resistance 28 results in a reduced voltage drop across the series resistance 28. Thus, the circuit of FIG. 2 operates to increase the voltage of the lower potential output terminal 14. When the voltage of the lower potential output 14 rises above the voltage limit, the comparator 20 alters the switch signal so as to reduce the conductivity of the switch 22.

The invention may also be used in conjunction with a separate voltage control method, such as secondary voltage control. The circuit of FIG. 2, for example, could be used with a secondary voltage controller which senses and controls the voltage of the higher potential output terminal 2. Thus, as the current carried by the higher potential series resistance 26 is varied by the invention, so as to regulate the voltage of the lower potential output terminal 14, the secondary voltage controller maintains the voltage of the higher potential output terminal 2 within a pre-set range. The secondary voltage controller accomplishes this by varying the voltage of the transformer.

The invention may also be used in conjunction with other voltage control methods, such as weighted sum secondary voltage control. This method, while similar to secondary voltage control in principle, senses the weighted combination of multiple output terminal voltages, instead of sensing the voltage of just one output terminal.

Figure 3:
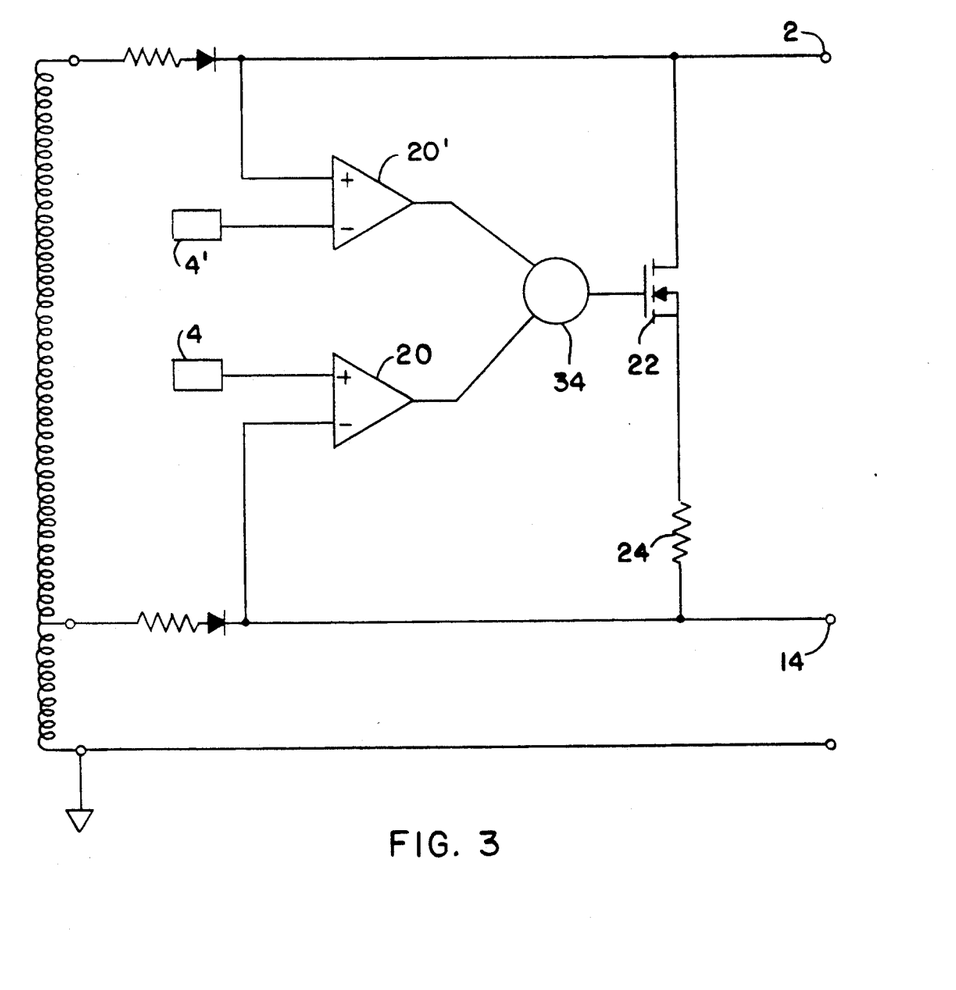
FIG. 3 is a schematic diagram of the invention used in a circuit to regulate one voltage output within a maximum voltage limit and another voltage output within a minimum voltage limit.

FIG. 3 shows an embodiment of the invention which regulates the voltages of two output terminals 2, 14 simultaneously. As in the previously described configurations, the two output terminals 2, 14 are connected by a series combination of a switch 22 and a current limiting resistor 24. In this case, however, two reference sources 4, 4' and two comparators 20, 20' are used. One comparator 20' monitors the higher potential output terminal 2 against a maximum voltage limit established by one reference source 4', while the other comparator 20 monitors the lower potential output terminal 14 against a minimum voltage limit established by the other reference source 4. The output of each of the two comparators 20, 20' is monitored by a junction 34, whose output is coupled to the control input of the switch 22. The junction 34 controls the conductivity of the switch 22 in response to the switch signals from the comparators 20, 20'. The circuit shown in FIG. 3 limits the voltage fluctuation of two output terminals 2, 14 simultaneously.

The junction 34 of FIG. 3 may be constructed from a resistor network, an operational amplifier, or the like. The inputs to the junction 34 may also be weighted so that the switch 22 is controlled in response to the weighted sum of the junction input voltages. This weighing may be accomplished, for instance, by using an operational amplifier as the junction, with differing series resistances at the junction inputs. In the preferred embodiment, the junction 34 controls the switch 22, embodied as a field effect transistor, such that the switch 22 operates in the linear range.

Figure 4:
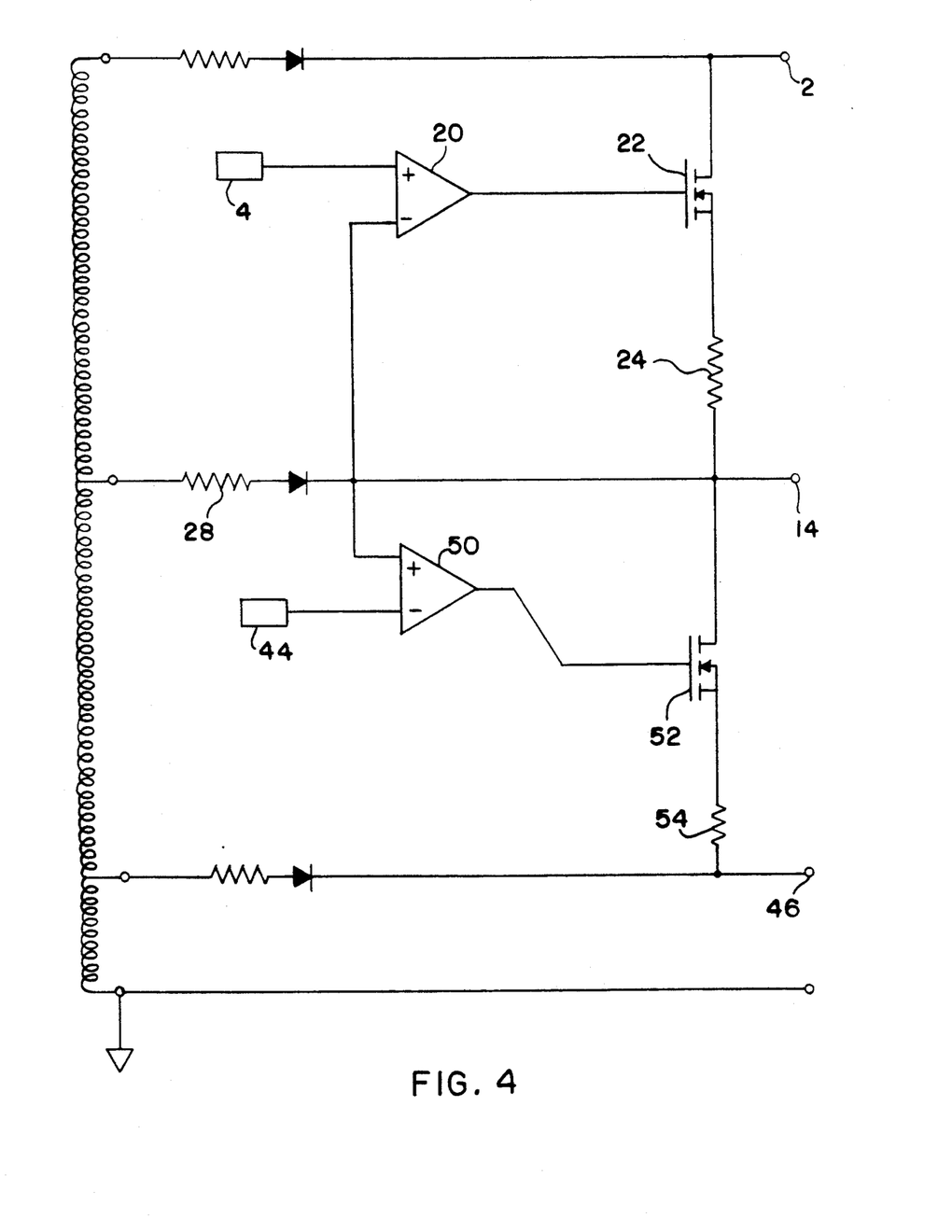
FIG. 4 is a schematic diagram of the invention used in a circuit to regulate one voltage output within a maximum and a minimum voltage limit.

As shown in FIG. 4, the invention may be used to control the voltage of an output terminal 14 between both maximum and minimum voltage limits. Each of the voltage limits is established by a corresponding reference source 4, 44. The power supply of FIG. 4 has three output terminals, designated higher potential 2, lower potential 14, and lowest potential 46 output terminals. The lower potential output terminal 14 is at a voltage potential between the voltage potentials of the other two output terminals 2, 46.

The circuit of FIG. 4 maintains the voltage of the lower potential output terminal 14 substantially equal to or less than the minimum voltage limit established by the reference source 4. As described for FIG. 2, the comparator 20 alters the switch signal so as to increase the conductivity of the switch 22 as the voltage of the lower potential output terminal 14 approaches the minimum voltage limit. Current is thereby diverted from the higher potential output terminal 2, through the current limiting resistor 24, reducing the current derived through the lower potential series resistance 28. The voltage of the lower potential output terminal 14 is thereby maintained substantially at or above the minimum voltage limit.

Additionally, the circuit of FIG. 4 maintains the voltage of the lower potential output terminal 14 substantially equal to or greater than the maximum voltage limit established by the reference source 44. The second comparator 50 alters the second switch signal so as to increase the conductivity of the second switch 52 as the voltage of the lower potential output terminal 14 approaches the maximum voltage limit. Current is thereby diverted from the lower potential output terminal 14 to the lowest potential output terminal 46, through the second current limiting resistor 54, increasing the current derived through the lower potential series resistance 28. The voltage of the lower potential output terminal 14 is thereby maintained substantially at or below the maximum voltage limit. Thus, the circuit of FIG. 4 operates to regulate the voltage of the lower potential output terminal 14 between the voltages limits established by the reference sources 4, 44.

Figure 5:
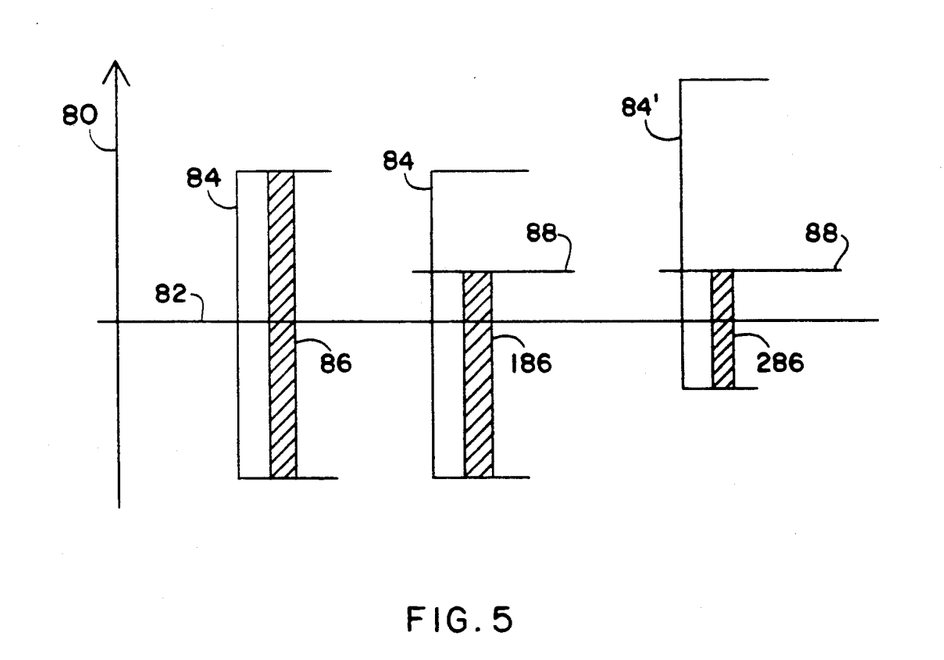
FIG. 5 is a graph of the output voltage range of a power supply using the invention.

FIG. 5 illustrates the effect of the circuit of FIG. 1 on the voltage of a power supply output terminal. The vertical axis 80 represents the voltage of the output terminal. A nominal voltage level 82 is shown to mark the desired output terminal voltage. A design voltage range 84 identifies the range of voltages that may be expected at the output terminal during operation of the power supply. The design voltage range 84 is defined primarily by the expected variation of load conditions. The resulting operating range 86 of the power supply output terminal encompasses the entire design voltage range 84. This operating range 86 represents the output terminal voltages possible under the expected load conditions.

By using the invention of FIG. 1, a voltage limit 88 may be established. As described, the invention maintains the output terminal voltage substantially at or below this voltage limit 88. The resulting operating range 186 of the power supply output terminal encompasses only a subset of the design voltage range 84.

Additional improvement of the operating range 186 may be achieved by choosing a transformer turns ratio that skews the design voltage range 84' relative to the nominal voltage level 82. Using such a skewed design voltage range 84', in conjunction with the voltage limit 88 established by the invention, the operating range 286 is further improved, as shown in FIG. 5.

While specific embodiments of the invention have been shown and described in detail to illustrate the application of the invention principles, it will be apparent that the invention may be embodied otherwise without deviating from the invention set forth in the following claims.

What is claimed is:

1. A direct current power supply comprising:

a transformer having two output taps and a reference terminal, one of the two output taps being at a higher voltage potential than the other of the two output taps;

two output terminals, one of the two output terminals being at a higher voltage potential than the other of the two output terminals;

means, connected between the higher potential output tap and the higher potential output terminal, for converting a.c. voltage at the higher potential output tap to d.c. voltage at the higher potential output terminal;

means, connected between the lower potential output tap and the lower potential output terminal, for converting a.c. voltage at the lower potential output tap to d.c. voltage at the lower voltage output terminal;

two series resistances, each series resistance creating a voltage drop, one of the two series resistances being coupled in series between the higher potential output tap and the higher potential output terminal, the other series resistance being coupled in series between the lower potential output tap and the lower potential output terminal;

means for producing a reference voltage, the reference voltage defining a voltage limit; and compensation means for altering the voltage drop across the series resistance of one of the two output terminals by diverting current from the higher potential output terminal to the lower potential output terminal, the alteration of the voltage drop being effective to compensate for variations of the voltage of the one output terminal and to maintain the voltage of the one output terminal substantially within the voltage limit.

2. The power supply of claim 1 wherein the compensation means boosts the voltage drop of the series resistance of the higher potential output terminal by diverting current when the voltage of the higher potential output terminal is greater than the voltage limit, the voltage of the higher potential output terminal being effectively maintained substantially equal to or less than the voltage limit.

3. The power supply of claim 1 wherein the compensation means comprises a field effect transistor.

4. The power supply of claim 1 wherein the compensation means suppresses the voltage drop of the series resistance of the lower potential output terminal by diverting current when the voltage of the lower potential output terminal is less than the voltage limit, the voltage of the lower potential output terminal being effectively maintained substantially equal to or greater than the voltage limit.

5. The power supply of claim 4 further comprising:
a third transformer output tap, the third output tap being at the lowest voltage potential relative to the other two of the three output taps;
a third output terminal, the third 1 terminal being at the lowest voltage potential relative to the other two of the three output terminals;
means, connected between the third output tap and the third output terminal, for converting a.c. voltage at the third output tap to d.c. voltage at the third output terminal;
a third series resistance, the third series resistance creating a voltage drop and being coupled in series between the third output tap and third output terminal;
means for producing a maximum reference voltage, the maximum reference voltage being greater than the reference voltage, the maximum reference voltage defining a maximum voltage limit; and
compensation means for altering the voltage drop across the series resistance of the lower potential output terminal by diverting current from the lower potential output terminal to the third output terminal when the voltage of the lower potential output terminal is greater than the maximum voltage limit to effectively maintain the voltage of the lower potential output terminal substantially equal to the maximum voltage limit.

6. The power supply of claim 4, further comprising means for producing a maximum reference voltage, the maximum reference voltage being greater than the reference voltage, the maximum reference voltage defining a maximum voltage limit, wherein the compensation means boosts the voltage drop of the series resistance of the higher potential output terminal by diverting current when the voltage of the higher potential output terminal is greater than the maximum voltage limit, the voltage of the higher potential output terminal thereby being maintained substantially equal to or less than the maximum voltage limit.

7. A direct current power supply comprising:
a transformer having a secondary winding with two output taps and a reference terminal, one of the two output taps being at a higher voltage potential than the other of the two output taps;
two output terminals, one of the two output terminals being at a higher voltage potential than the other of the two output terminals;
means, connected between the higher potential output tap and the higher potential output terminal, for converting a.c. voltage at the higher potential output tap to d.c. voltage at the higher potential output terminal;
means, connected between the lower potential output tap and the lower potential output terminal, for converting a.c. voltage at the lower potential output tap to d.c. voltage at the lower potential output terminal;
two series resistances, each series resistance creating a voltage drop, one of the two series resistances being coupled in series between the higher potential output tap and the higher potential output terminal, the other series resistance being coupled in series between the lower potential output tap and the lower potential output terminal;
means for producing a reference voltage, the reference voltage defining a voltage limit;
a resistor;
a switch, responsive to a switch signal, the switch and resistor being connected in series between the two output terminals; and
means for comparing the voltage of one of the two output terminals with the voltage limit, the comparing means producing the switch signal when the voltage of the compared output terminal is outside of or approximately equal to the voltage limit, the switch signal causing the switch to divert current from the higher potential output terminal to the lower potential output terminal to effectively maintain the voltage of the compared output terminal substantially within the voltage limit by altering the voltage drop across the series resistance of the compared output terminal to compensate for variations of the voltage of the compared output terminal.

8. The power supply of claim 7 wherein the comparing means has two inputs, one of the two inputs being coupled to the reference voltage means, the other of the two inputs being coupled to the higher potential output terminal, the comparing means producing the switch signal when the voltage of the higher potential output terminal is approximately equal to or greater than the voltage limit, the voltage of the higher potential output terminal thereby being maintained substantially equal to or less than the voltage limit.

9. The power supply of claim 7 wherein the switch comprises a field effect transistor.

10. The power supply of claim 7 wherein the comparing means has two inputs, one of the two inputs being coupled to the reference voltage means, the other of the two inputs being coupled to the lower potential output terminal, the comparing means producing the switch signal when the voltage of the lower potential output terminal is approximately equal to or less than the voltage limit, the voltage of the higher potential output terminal thereby being maintained substantially equal to or greater than the voltage limit.

11. The power supply of claim 10 further comprising:
a third transformer output tap, the third output tap being at the lowest voltage potential relative to the other two of the three output taps;
a third output terminal, the third output terminal being at the lowest voltage potential relative to the other two of the three output terminals;
means, connected between the third output tap and the third output terminal, for converting a.c. voltage at the third output tap to d.c. voltage at the third output terminal;
means for producing a maximum reference voltage, the maximum reference voltage being greater than the reference voltage, the maximum reference voltage defining a maximum voltage limit;
a second resistor;
a second switch, responsive to a second switch signal, the second switch and second resistor being connected in series between the lower potential output terminal and the third output terminal; and
means for comparing the maximum voltage limit with the voltage of the lower potential output terminal, the maximum voltage limit comparing means producing the second switch signal when the voltage of the lower potential output terminal is greater than or approximately equal to the maximum voltage limit, the second switch signal causing the second switch to close thereby diverting current from the lower potential output terminal to the third output terminal to effectively maintain the voltage of the lower potential output terminal substantially equal to the maximum voltage limit by boosting the voltage drop across the series resistance of the lower potential output terminal.

12. The power supply of claim 10, further comprising means for producing a maximum reference voltage, the maximum reference voltage being greater than the reference voltage, the maximum reference voltage defining a maximum voltage limit, wherein the comparing means further comprises a third input coupled to the higher potential output terminal and a fourth input coupled to the maximum reference voltage means, the comparing means further producing the switch signal when the voltage of the higher potential output terminal is approximately equal to or greater than the maximum voltage limit, the voltage of the higher potential output terminal thereby being maintained substantially equal to or less than the maximum voltage limit.

13. The power supply of claim 12 wherein the comparing means comprises an operational amplifier.

14. A direct current power supply comprising:
a transformer having a secondary winding with two output taps and a reference terminal, one of the two output taps being at a higher voltage potential than the other of the two output taps;
two output terminals, one of the two output terminals being at a higher voltage potential than the other of the two output terminals;
means, connected between the higher potential output tap and the higher potential output terminal, for converting a.c. voltage at the higher potential output tap to d.c. voltage at the higher output terminal;
means, connected between the lower potential output tap and the lower potential output terminal, for converting a.c. voltage at the lower potential output tap to d.c. voltage at the lower potential output terminal;
two series resistances, each series resistance creating a voltage drop, one of the two series resistances being coupled in series between the higher potential output tap and the higher potential output terminal, the other series resistance being coupled in series between the lower potential output tap and the lower potential output terminal;
means for producing a reference voltage, the reference voltage defining a voltage limit;
a resistor;
means for diverting current from the higher potential output terminal to the lower potential output terminal, the diverting means being responsive to a switch signal, the diverting means and resistor being connected in series between the two output terminals; and
means for comparing the voltage of one of the two output terminals with the voltage limit, the comparing means producing the switch signal such that the diverting means diverts an increasing amount of current from the higher potential output terminal to the lower potential output terminal as the voltage of the compared output terminal approaches the voltage limit causing the voltage drop across the series resistance of the compared output terminal to be altered in compensation for variations of the voltage of the compared output terminal, the alteration of this voltage drop being effective to maintain the voltage of the compared output terminal substantially within the voltage limit.

15. The power supply of claim 14 wherein the comparing means has two inputs, one of the two inputs being coupled to the reference voltage means, the other of the two inputs being coupled to the higher potential output terminal, the comparing means producing the switch signal such that the diverting means diverts an increasing amount of current as the voltage of the higher potential output terminal increases, approaching the voltage limit, causing the voltage drop across the series resistance of the higher potential output terminal to be increasingly boosted in relation with the increasing amount of diverted current, the boosting of this voltage drop being effective to maintain the voltage of the higher potential output terminal substantially equal to or less than the voltage limit.

16. The power supply of claim 14 wherein the diverting means comprises a field effect transistor.

17. The power supply of claim 16 wherein the comparing means comprises an operational amplifier.

18. The power supply of claim 14 wherein the comparing means has two inputs, one of the two inputs being coupled to the reference voltage means, the other of the two inputs being coupled to the lower potential output terminal, the comparing means producing the switch signal such that the diverting means diverts an increasing amount of current as the voltage of the lower potential output terminal increases, approaching the voltage limit, causing the voltage drop across the series resistance of the lower potential output terminal to be increasingly suppressed in relation with the increasing amount of diverted current, the suppression of this voltage drop being effective to maintain the voltage of the lower potential output terminal substantially equal to or greater than the voltage limit.

19. The power supply of claim 18 further comprising:
a third transformer output tap, the third output tap being at the lowest voltage potential relative to the other two of the three output taps;
a third output terminal, the third output terminal being at the lowest voltage potential relative to the other two of the three output terminals;
means, connected between the third output tap and the third output terminal, for converting a.c. voltage at the third output tap to d.c. voltage at the third output terminal;
a third series resistance having a voltage drop and being coupled in series between the third output tap and the third output terminal;
means for producing a maximum reference voltage, the maximum reference voltage being greater than the reference voltage, the maximum reference voltage defining a maximum voltage limit;
a second resistor;
means for diverting current to the third output terminal from the lower potential output terminal, the third output terminal diverting means being responsive to a second switch signal, the third output terminal diverting means and second resistor being connected in series between the lower potential output terminal and the third output terminal; and
means for comparing the voltage of the maximum voltage limit with the voltage of the lower potential output terminal, the maximum voltage limit comparing means producing the second switch signal such that the third output terminal diverting means diverts an increasing amount of current from the lower potential output terminal to the third output terminal as the voltage of the lower potential output terminal approaches the maximum voltage limit causing the voltage drop across the series resistance of the lower potential output terminal to be increasingly boosted in relation with the increasing amount of current diverted to the third output terminal, the boosting of this voltage drop being effective to maintaining the voltage of the lower potential output terminal substantially equal to the maximum voltage limit.

20. The power supply of claim 18, further comprising means for producing a maximum reference voltage, the maximum reference voltage being greater than the reference voltage, the maximum reference voltage defining a maximum voltage limit, wherein the comparing means further comprises a third input coupled to the higher potential output terminal and a fourth input coupled to the maximum reference voltage means, the comparing means further producing the switch signal such that the diverting means diverts an increasing amount of current as the voltage of the higher potential output terminal increases, approaching the maximum voltage limit causing the voltage drop across the series resistance of the higher potential output terminal to be increasingly boosted in relation with the increasing amount of diverted current, the boosting of this voltage drop being effective to maintain the voltage of the higher potential output terminal substantially equal to or less than the maximum voltage limit.

* * * * *